United States Patent [19]

Murphy et al.

[11] Patent Number: 5,556,497
[45] Date of Patent: Sep. 17, 1996

[54] FITTING INSTALLATION PROCESS

[75] Inventors: James C. Murphy; Kevin Goodge; Jim Hlebovy, all of Chardon, Ohio

[73] Assignee: Essef Corporation, Chardon, Ohio

[21] Appl. No.: 370,526

[22] Filed: Jan. 9, 1995

[51] Int. Cl.⁶ .......................... B29C 65/02; B29C 65/20
[52] U.S. Cl. .................. 156/172; 156/253; 156/304.2; 156/304.6; 220/465
[58] Field of Search .................................. 220/465, 601, 220/661, 582; 156/253, 296, 304.2, 304.6, 172

[56] References Cited

U.S. PATENT DOCUMENTS

| | | |
|---|---|---|
| 3,743,566 | 7/1973 | Louthan et al. ........................ 156/296 |
| 3,945,578 | 3/1976 | Kaminsky et al. . |
| 4,507,168 | 3/1985 | Konaka . |
| 4,685,589 | 4/1987 | Benton . |
| 4,695,337 | 9/1987 | Christine . |
| 4,740,262 | 4/1988 | Yavorsky et al. . |
| 4,767,478 | 8/1988 | Christine . |
| 5,012,950 | 5/1991 | Knappe . |
| 5,046,634 | 9/1991 | McFarlin et al. . |
| 5,151,149 | 9/1992 | Swartz . |
| 5,158,200 | 10/1992 | Vago et al. . |
| 5,286,327 | 2/1994 | Swartz . |
| 5,328,541 | 7/1994 | Usui et al. . |
| 5,429,845 | 7/1995 | Newhouse et al. ..................... 220/465 |

FOREIGN PATENT DOCUMENTS 2019447  11/1971  Germany ............................. 220/661

Primary Examiner—Steven D. Maki
Attorney, Agent, or Firm—Pearne, Gordon, McCoy & Granger

[57] ABSTRACT

A molded plastic vessel is provided with a fitting or other attachment after molding and before winding of the vessel. The fitting is provided with a plastic insert. The insert and a wall of the vessel are heated and welded together to hold the fitting on the vessel. The tank is filament wound for reinforcement, and the filaments capture the fitting to hold the fitting on the wall. The wall is opened to provide a passage through the fitting into the vessel. An apparatus is provided that carries and moves the fitting, insert, and a heater to install the fitting on the vessel.

12 Claims, 3 Drawing Sheets

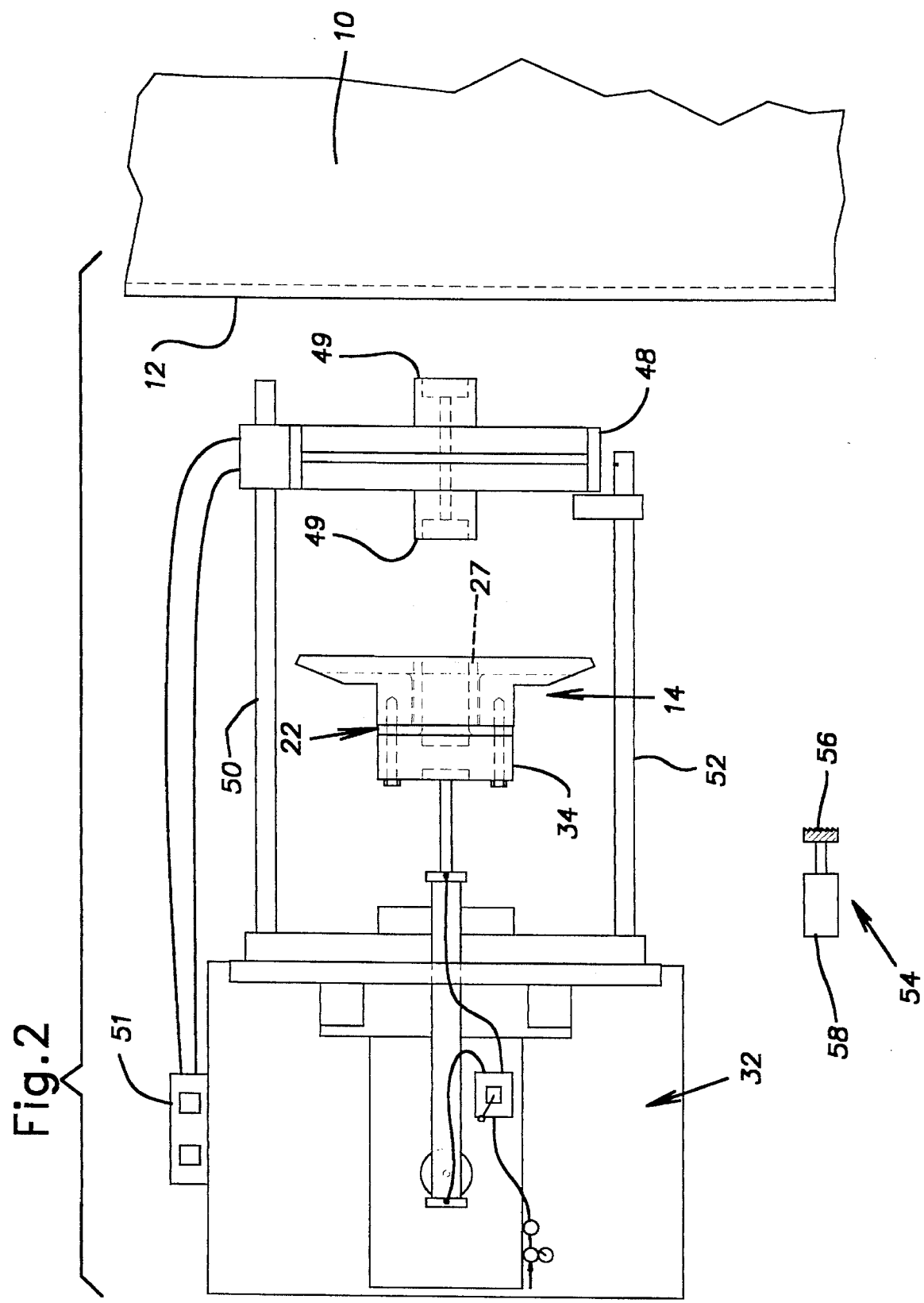

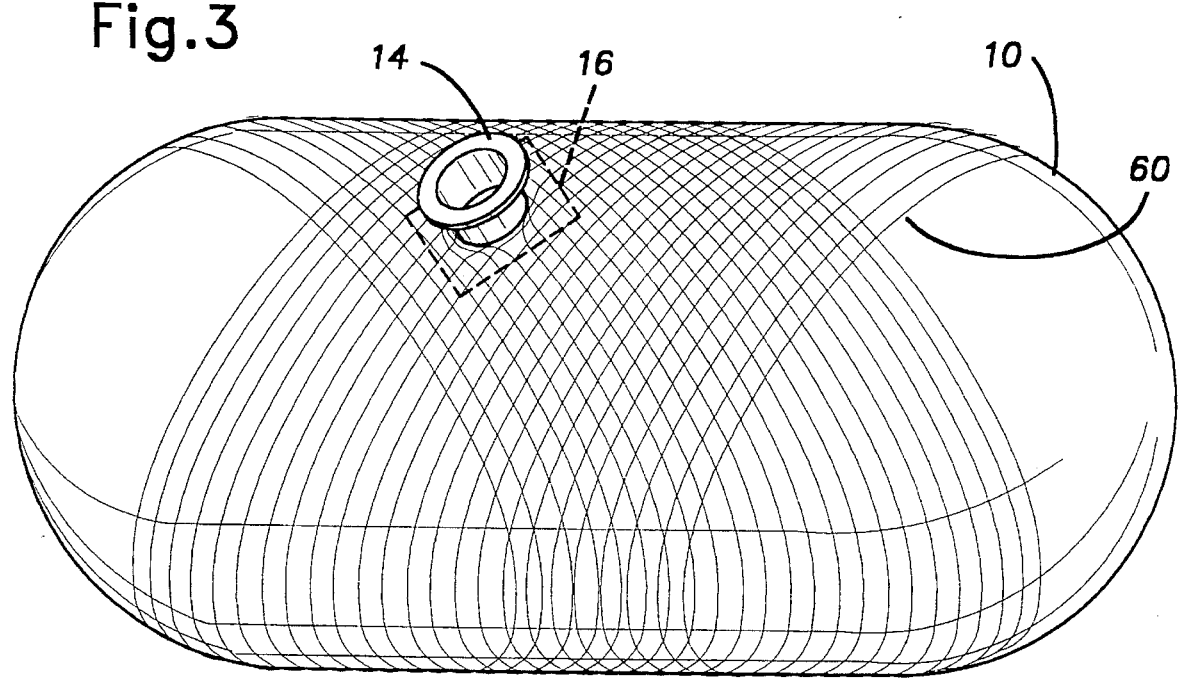

FITTING INSTALLATION PROCESS

BACKGROUND OF THE INVENTION

1. Field of the Invention

This invention relates generally to the field of plastic vessels and specifically to a process for installing a fitting on such a vessel.

2. Description of the Related Art

Molded vessels have numerous applications for containing fluids. The vessels are made by any of several plastic forming processes, including rotational molding and blow molding. Many of the fluids are contained at high pressure. Therefore, the vessels are reinforced by filaments wound on the outer surface of the vessel, as described, for example, in U.S. Pat. Nos. 3,945,578 to Kaminsky and 5,012,950 to Knappe, both incorporated herein by reference.

Such vessels need one, and frequently several, ports for filling or emptying the vessel. The ports are commonly provided as a rigid fitting adapted to connect to a hose or pipe. Such fittings can be provided during the molding process. For example, a metal fitting can be held in the mold and the plastic molded around the fitting. This method, however, cannot be used to add a fitting after molding. Moreover, reconfiguring a mold is costly, thus, fittings cannot be located at different locations based on specified applications. U.S. Pat. No. 4,685,589 to Benton describes one way of installing a fitting after molding and before winding a vessel. An elastic seal is disposed between the fitting and the vessel.

Still, the need remains for a method of fabricating a fitting that allows the fitting to be located after molding of the vessel. The fitting should be firmly secured on the vessel and bonded therewith prior to winding.

SUMMARY OF THE INVENTION

The present invention provides a method of manufacturing a fluid containing vessel having a fitting. The steps include forming a liner; providing a preformed fitting having a flange; installing an insert in the fitting; and positioning the fitting on a wall of the liner and welding the insert to the wall. Additional steps include filament winding the liner, said filaments capturing the fitting flange against the wall; and cutting a hole through the wall of the liner inside the fitting to create a passage through the fitting and liner wall.

Preferably, the fitting defines a passage therethrough, and the insert is installed in the passage. The insert has a flange that engages the fitting to retain the fitting on the liner. The passage communicates with an interior of the liner through the hole. When the liner and insert are made of materials having substantially similar melting temperatures, they are heated to about the same temperature. When the liner and insert have different melting temperatures, they are heated to different temperatures. The liner and insert are made of materials compatible for welding to each other, preferably plastic. The liner is generally cylindrical, and the fitting is located on a generally cylindrical side wall of the liner. The step of welding includes heating the insert and an area of the liner and pressing the insert into the liner to bond therewith.

According to one aspect of the invention, the method includes rotationally molding the liner of plastic material having a generally cylindrical shape. The fitting is preformed with the flange and passage therethrough. The insert, of the same material as the liner, is installed in the passage of the fitting, and the insert flange engages the fitting. Heating the insert and an area of the cylindrical wall of the liner where the fitting is to be installed softens the fitting and the area of the wall. The flange of the fitting is installed on the area of the wall and the insert is pressed into the area so as to bond the insert to the wall. Filament winding of the liner captures the fitting flange against the wall. Cutting a hole through the wall of the liner inside the fitting creates a port through the passage.

The invention also provides an apparatus for installing a fitting on a molded vessel liner. The apparatus includes means for supporting the fitting and an insert near the liner; a heater; means for positioning the heater between the fitting and the liner for heating the insert and an area of the liner; and means for positioning the fitting on the liner and pressing the insert into the liner to weld the insert to the liner.

According to a preferred aspect of the invention, the apparatus for installing the fitting on the molded vessel liner includes a platform. A mounting head is movably mounted on the platform and adapted for supporting the fitting and the insert near the liner, positioning the fitting on the liner, and pressing the insert into the liner. A driver is adapted to move the mounting head. A heat mirror is movably mounted on the platform on a support arm having the heat mirror pivotably mounted thereon. The support arm is adapted for positioning the heater between the fitting and the liner.

BRIEF DESCRIPTION OF THE DRAWINGS

FIG. 2 shows a top view of the apparatus, assembled fitting, and liner of FIG. 1; and FIG. 3 shows an isometric view of the wound vessel with the fitting installed thereon.

DESCRIPTION OF THE PREFERRED EMBODIMENTS

Figure 1:
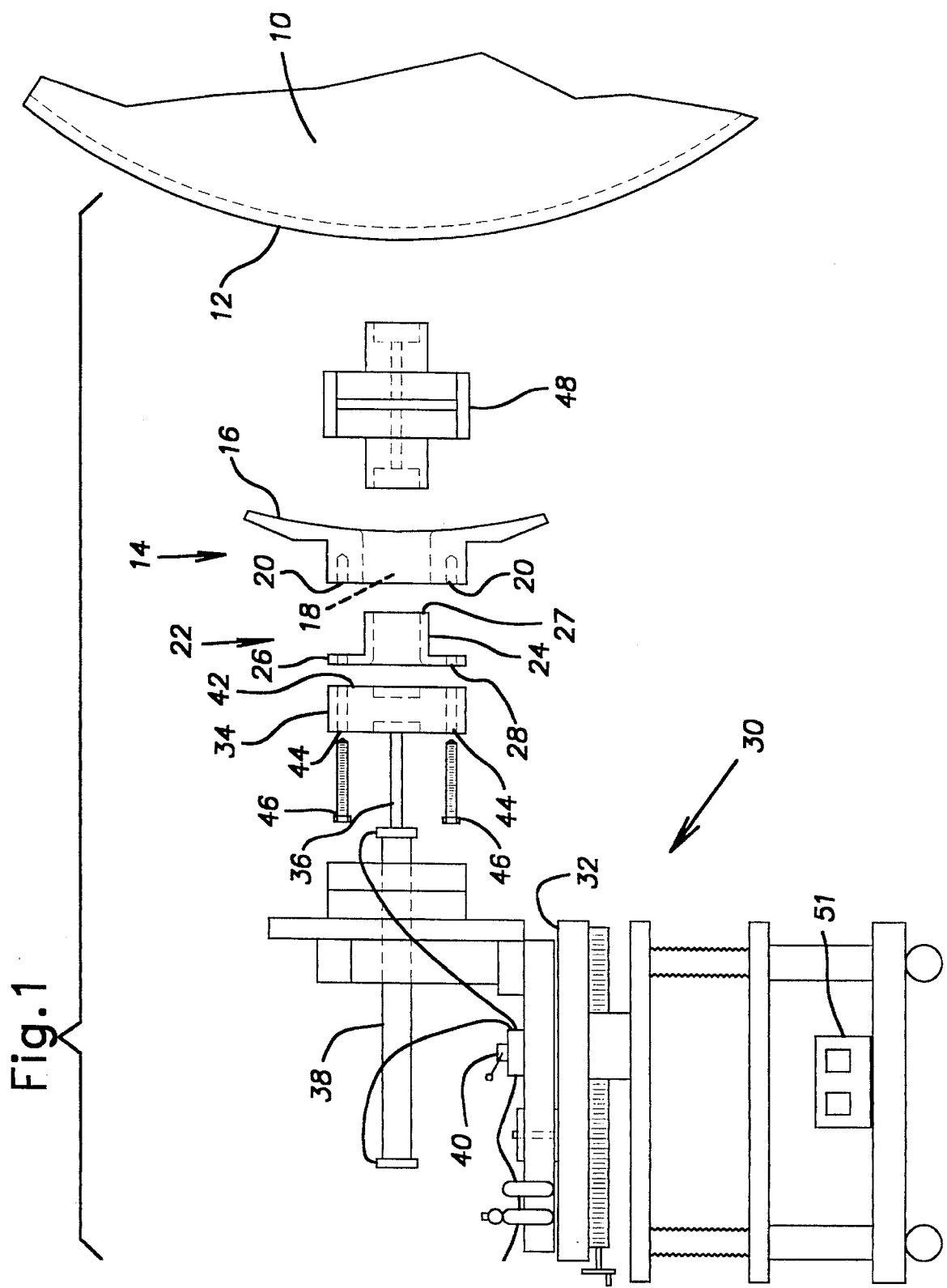
FIG. 1 shows a partially exploded side elevational view of an apparatus for installing a fitting on a liner and a partial end view of the liner.

Referring to FIG. 1, a molded tank liner 10 for a vessel is made from a suitable polymer, such as polyethylene, by rotational molding, blow molding, or the like. The liner 10 is conventional and can have any of a number of shapes and constructions including a side wall 12 that defines an internal volume.

A fitting 14 has a flange 16 and a cylindrical passage 18 therethrough. The fitting is made of metal, a composite, sheet molding compound, bulk molding compound or other suitable durable material. The fitting 14 can be threaded or otherwise suitable for connecting to another fitting or a conduit. A pair of threaded bores 20 are provided in a face of the fitting 14. An insert 22 has a cylindrical body 24 adapted to fit in the cylindrical passage 18 of the fitting 14. The insert 22 is preferably molded from a material compatible with the liner 10 and adapted to be bonded therewith by welding, such as polyethylene. The insert 22 is provided with an annular flange 26 for preventing the insert from passing through the passage 18 of the fitting 14. The body defines an edge 27 adapted to be flush with or extend slightly from the flange 16 of the fitting 12. A pair of holes 28 corresponding with the threaded bores 20 are provided through the flange 26.

An installation apparatus 30 is adapted to be located near the liner 10 and includes a vertically and laterally adjustable platform 32. The platform is adjustable by manual or powered devices, such as cranks and threaded shafts. A horizontally movable mounting head 34 is supported on a horizontal shaft 36 of a driver, such as a hydraulic or pneumatic cylinder 38, mounted to the platform 32. The cylinder 38 is powered by fluid controlled by a head controller 40.

The mounting head 34 has a front face 42 adapted to engage the flange 26 of the insert 22. A pair of holes 44 corresponding with the insert holes 28 are provided through the head 34. A pair of bolts 46 are installed through the holes 44, 28 and threaded into the bores 20 to mount the fitting 14 and insert 22 on the mounting head 34. Alternatively, the fitting 14 can be mounted on the head 34 by a clamp or other suitable mounting means. The fitting 14 is firmly mounted so that the insert flange 26 engages the fitting 14.

Referring to FIG. 2, a heater 48, such as a two sided heat mirror, is disposable between the mounting head 34 and the liner 10. A pair of heating spigots 49 conforming to the wall 12 and insert 22 direct and focus heat emanating from the heater 48. Alternatively, the heater can be two separate one-sided heat mirrors or other heating means. The heater can be hand held or supported on a suitable stationary or movable structure. The two sides of the heater 48 are separately controlled by a heater control 51. Preferably, the heater 48 is carried on the platform 32 by a pivotable support arm 50 and a brace arm 52. The support arm 50 is adapted to pivot, thereby moving the heater 48 to a vertical position providing clearance for the head 34 to move the fitting 14 toward the liner 10. In a horizontal position shown, the heater 48 is held at a constant level and prevented from shifting by the brace arm 52. A rotary grinder 54 having a cutting tool 56 powered by a motor 58 is provided on the platform 32 or separately therefrom. A hand held grinder 54 is suitable.

In operation, referring to FIGS. 1 and 2, the installation apparatus 30 is located near the previously molded liner 10. The heater 48 is moved to its horizontal position and located proximate to a location on the liner 10 where the fitting 14 is to be installed. The mounting head 34 is moved to a retracted position away from the heater 48. The insert 22 is installed in the passage 18 of the fitting 14 so that the insert flange 26 engages the fitting 14. The fitting 14 and insert 22 are mounted on the mounting head 34 with the bolts 46. The head 34, insert 22 and fitting 14 are moved to an intermediate position wherein the flange 16 of the fitting 14 and edge 27 of the insert are proximate to the heater 48.

The heater 48 is activated to heat the edge 27 of the insert 22 and an area of the wall 12 of the liner 10. The edge 27 and wall 12 are softened or melted to a point at which they can be bonded together. The heater 48 is automatically or manually controllable to properly heat the edge 27 and wall 12. The heat required depends on the materials. Opposite sides of the heater 48 can be separately controlled to provide the proper temperature for different insert 22 and liner 10 materials. If the application allows, the heater can be automatically controlled to provide adequate heating for successive liners and fittings. The heater 48 is deactivated and the support arm 50 is pivoted to move the heater 48 to its vertical position. The mounting head 34 is moved to an extended position wherein the flange 16 is pressed against the wall 12 and the insert 22 is welded to the wall 12. The fitting 14 is held against the wall under pressure from the cylinder 38 for a sufficient time to bond the insert 22 to the wall 12. The time and pressure depend on the materials and will be apparent to one skilled in the art of plastics. The fitting 14 is held in place without pressure until the insert 22 and wall 12 have cooled sufficiently to hold the fitting 14. The mounting head 34 is separated from the insert 22 and fitting 14, by removing the bolts 46, and the mounting head 34 is retracted. The grinder 54 is then used to remove the portion of the wall 12 inside the insert 22 to cut or grind open the interior of the liner 10 and place the interior of the liner in communication with the passage 18. Finally the liner is filament 60 wound in a conventional manner, as shown in FIG. 3. The filaments 60 pass over and capture the flange 16 of the fitting to securely hold the fitting on the liner 10. If it is necessary to entirely remove the insert 22, the liner 10 should be filament wound prior to grinding or cutting out the insert 22 and portion of the wall 12. The fitting 14 is then suitable for connecting conduits to the vessel.

The present disclosure describes several embodiments of the invention, however, the invention is not limited to these embodiments. For example, other devices and fittings, such as sight gauges, flanges, etc. can be installed on other vessels according to the present invention. Other variations are contemplated to be within the spirit and scope of the invention and appended claims.

What is claimed is:

1. A method of manufacturing a fluid containing vessel having a fitting, comprising the steps of:

forming a liner defining the vessel;

providing a preformed fitting having a top surface;

providing an insert comprising an annular body having a flange at one end of the annular body and an edge at another end of the annular body;

installing the annular body of the insert in the fitting and engaging the flange of the insert with the top surface of the fitting; and positioning the fitting on a wall of the liner; and welding the edge of the annular body of the insert to the wall; the flange of the insert retaining the fitting on the wall.

2. A method according to claim 1, further comprising the step of winding filaments on the liner, said filaments capturing the fitting against the wall.

3. A method according to claim 2, wherein the annular body of the insert is disposed within a passage of the fitting during the installing step and the passage is placed in communication with the interior of the liner through a hole through the wall.

4. A method according to claim 1, wherein the fitting defines a passage and further comprising the step of cutting a hole through the wall of the liner at the fitting to create a passage through the liner wall communicating with the fitting passage.

5. A method according to claim 1, wherein the step of welding includes heating an area of the liner and the edge of the annular body of the insert to about the same temperature.

6. A method according to claim 1, wherein the liner and insert are made of materials having substantially different melting temperatures and the step of welding includes heating an area of the liner and the edge of the annular body of the insert to different temperatures.

7. A method according to claim 4, wherein the liner and insert are made of plastic.

8. A method according to claim 1, wherein the liner is generally cylindrical.

9. A method according to claim 8, wherein the fitting is installed on a generally cylindrical side wall of the liner.

10. A method according to claim 1, wherein the step of welding includes heating the edge of the annular body of the insert and an area of the liner and pressing the edge of the annular body of the insert onto the liner to bond therewith.

11. A method of manufacturing a fluid containing vessel having a fitting, comprising the steps of:

forming a liner;

providing a preformed fitting having a flange and defining a passage therethrough;

providing an insert comprising an annular body having a flange at one end of the annular body and an edge at another end of the annular body;

installing the annular body of the insert in the fitting and engaging the flange of the insert with a top surface of the fitting;

positioning the fitting on a wall of the liner and welding the edge of the annular body of the insert to the wall; the insert flange retaining the fitting on the liner;

winding filaments on the liner, said filaments capturing the fitting flange against the wall; and cutting a hole through the wall of the liner at the fitting to create a port through the wall communicating with the passage of the fitting.

12. A method of manufacturing a fluid containing vessel having a port, comprising the steps of:

rotationally molding a liner of plastic material having a generally cylindrical shape;

providing a preformed fitting having a flange and a passage therethrough;

providing an insert of the same material of the liner, said insert comprising an annular body having a flange at one end of the annular body and an edge at another end of the annular body;

installing the annular body of the insert in the fitting and engaging the flange of the insert with a top surface of the fitting;

heating the edge of the annular body of the insert and an area of a cylindrical wall of the liner where the fitting is to be installed to soften the edge of the annular body of the insert and the area of the wall;

locating the flange of the fitting on the area of the wall and pressing the edge of the annular body of the insert onto the area so as to bond the insert to the wall; and winding filaments on the liner, said filaments capturing the fitting flange against the wall; and cutting a hole through the wall of the liner at the fitting to create a passage through the liner wall communicating with the fitting passage.

* * * * *

UNITED STATES PATENT AND TRADEMARK OFFICE
CERTIFICATE OF CORRECTION

PATENT NO. : 5,556,497
DATED : September 17, 1996
INVENTOR(S) : Murphy et al.

It is certified that error appears in the above-indentified patent and that said Letters Patent is hereby corrected as shown below:

Claim 7, column 4, line 56, please delete "claim 4" and insert --claim 1--.

Claim 8, column 4, line 58, please delete "claim 1" and insert --claim 4--.

Signed and Sealed this

Eleventh Day of February, 1997

Attest:

BRUCE LEHMAN

*Attesting Officer*   *Commissioner of Patents and Trademarks*